United States Patent [19]

Miyatake et al.

[11] Patent Number: 4,615,589

[45] Date of Patent: Oct. 7, 1986

[54] PROJECTION LENS SYSTEM FOR PROJECTION TELEVISION APPARATUS

[75] Inventors: Yoshito Miyatake, Hirakata; Yoshiharu Yamamoto, Toyonaka, both of Japan

[73] Assignee: Matsushita Electric Industrial Co., Ltd., Osaka, Japan

[21] Appl. No.: 662,975

[22] Filed: Oct. 18, 1984

[30] Foreign Application Priority Data

Oct. 19, 1983 [JP] Japan .................... 58-195637

[51] Int. Cl.⁴ .................. G02B 3/04; G02B 9/12
[52] U.S. Cl. ...................... 350/477; 350/432
[58] Field of Search ............ 350/432, 477, 412

[56] References Cited

U.S. PATENT DOCUMENTS

| 4,300,817 | 11/1981 | Betensky | 350/477 |
| 4,348,081 | 9/1982 | Betensky | 350/477 |
| 4,548,480 | 10/1985 | Yamamoto et al. | 350/432 |

FOREIGN PATENT DOCUMENTS

| 0108818 | 7/1982 | Japan | 350/432 |
| 0140708 | 8/1983 | Japan | 350/432 |

Primary Examiner—John K. Corbin
Assistant Examiner—Rebecca D. Gass
Attorney, Agent, or Firm—Wenderoth, Lind & Ponack

[57] ABSTRACT

A projection lens system for a projection television for projecting on a screen an enlargement of an image displayed on a cathode ray tube includes a first bi-aspherical lens of positive power, the surface of which is toward the end of the lens system which is to face the screen being a convex surface having a larger curvature than the other surface thereof, a second double convex lens of glass, and a third bi-aspherical lens of negative power, the surface of which is toward the screen end being a concave surface having a larger curvature than the other surface thereof, the first, second and third lens being disposed in the order from the screen end, and satisfying the conditions: $1.3f < f_1 < 1.9f$; $0.9f < f_2 < 1.2f$; $0.25f < d_4 < 0.35f$; $r_1 < |r_2|$; and $0.4 < r_3/|r_4| < 0.75$, where f is the total focal length, $f_1$ and $f_2$ are the respective focal lengths of the first and second lenses, $d_4$ is the distance between the second and third lens, and $r_1$, $r_2$, $r_3$ and $r_4$ are the respective radii of vertex curvatures of the first, second, third and fourth lens surfaces from the screen end.

1 Claim, 6 Drawing Figures

PROJECTION LENS SYSTEM FOR PROJECTION TELEVISION APPARATUS

BACKGROUND OF THE INVENTION

1. Field of the Invention

This invention relates to a lens system for a television image projection apparatus, and more particularly to a lens having an F number of 1.0 or less and a field angle of about 40° for projecting on a screen an enlargement of an image displayed on a cathode ray tube.

2. Description of the Prior Art

For obtaining a television image on a large picture screen, there is a method of enlarging and projecting by a lens onto the screen the image displayed on the cathode ray tube. In this case, it is desirable that the projected image on the screen be as bright as possible so that the cathode ray tube should emit light as high as possible and also a bright lens should be used. For the purpose of the above, there have been known bright projection lens systems with F 1.0 consisting of six glass elements. Also U.S. Pat. Nos. 4,300,817 and 4,348,081 disclose projection lens systems each of which consists of three elements made of acrylic resin and which have an aspherical surface. In a case of using lenses all of which are made of acrylic resin, since the temperature dependency of the refractive index of acrylic resin is larger by one digit than that of glass, the image moves due to an ambient temperature change, so that a focal shift or a misconvergence occurs. Therefore, a hybrid lens consisting of three elements made of glass and acrylic resin has hitherto been proposed. A further bright lens of F1.0 or less is desired, but this will create the following new problems.

The optical system at present mainly used for a television image projection apparatus, as shown in FIG. 1, uses three cathode ray tubes 1R, 1G and 1B which are red, green and blue respectively and three lenses 2R, 2G and 2B. The three lenses 2R, 2G and 2B are disposed in the same plane so that the optical axes 3R, 3G and 3B converge at one point on a screen 4 or in the vicinity thereof. The green cathode ray tube 1G is disposed behind the central lens 2G and on the common optical axis therewith, but the red and blue cathode ray tubes 1R and 1B must be tilted with respect to the optical axes 3R and 3B of lenses 2R and 2B respectively in order to register the projected image planes. The tilting angle $\theta$ becomes larger as the F number of each lens 2R, 2G and 2B becomes smaller. In order to make the apparatus compact, when the projection distance (the distance from the utmost end of lens 2G to the screen 4) is reduced, the tilting angle $\theta$ becomes larger. Thus, when the tilting angle $\theta$ becomes larger, the distance between the lens and the cathode ray tube (distance between the lens 2G and the cathode ray tube 1G) should be increased as required. In a case where the heat developed in the cathode ray tubes 1R, 1G and 1B adversely affects the lenses 2R, 2G and 2B respectively, the distance between the lens system and the cathode ray tube should be further increased. In the aforesaid conventional example, the distance between the lens system and the cathode ray tube has been insufficient.

SUMMARY OF THE INVENTION

This invention has been made to improve the above matters. An object of the invention is to provide projection lens system which is very bright, has a longer distance between the lens and the cathode ray tube than that of a conventional one, is inexpensive, and is free from focal shift or a misconvergence due to a change in the temperature.

The lens system of the invention comprises a first bi-aspherical lens of positive power, one surface of which is a convex surface of a larger curvature than the other surface and directed toward a screen, a second lens which is a double convex glass lens, and a third bi-aspherical lens of negative power, one surface of which is a concave surface of a larger curvature than the other and directed toward the screen. The three lenses are disposed in the order from the screen side and satisfy the following conditions:

(1) $1.3f < f_1 < 1.9f$
(2) $0.9f < f_2 < 1.2f$
(3) $0.25f < d_4 < 0.35f$
(4) $r_1 < |r_2|$
(5) $0.4 < r_3/|r_4| < 0.75$ where f: the total focal length, $f_1$, $f_2$: focal lengths of the first and second lenses respectively, $d_4$: the distance between the opposing faces of the second lens and the third lens, and $r_1$, $r_2$, $r_3$ and $r_4$: radii of vertex curvatures of the first, second, third and fourth surfaces from the screen end respectively.

The above and further objects and novel features of the invention will more fully appear from the embodiment in the following description with reference to the accompanying drawings.

DESCRIPTION OF THE PREFERRED EMBODIMENT

Figure 1:
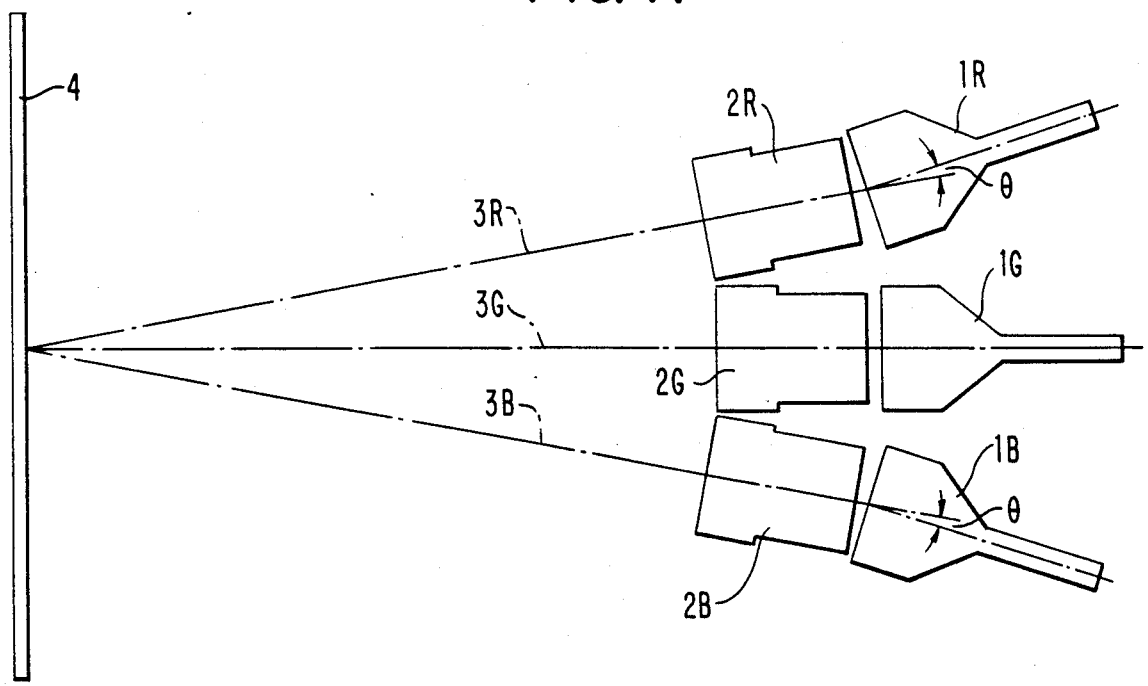
FIG. 1 is a schematic structural view of an optical system for a television image projection apparatus to which an image projection lens system of the invention is applicable.
Figure 2:
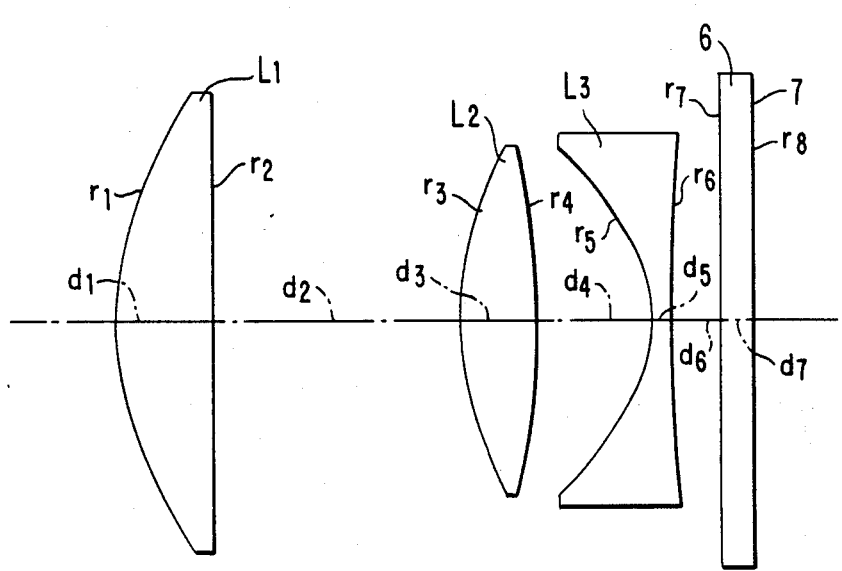
FIG. 2 is a structural view of an image projection lens system of the invention.
Figure 3:
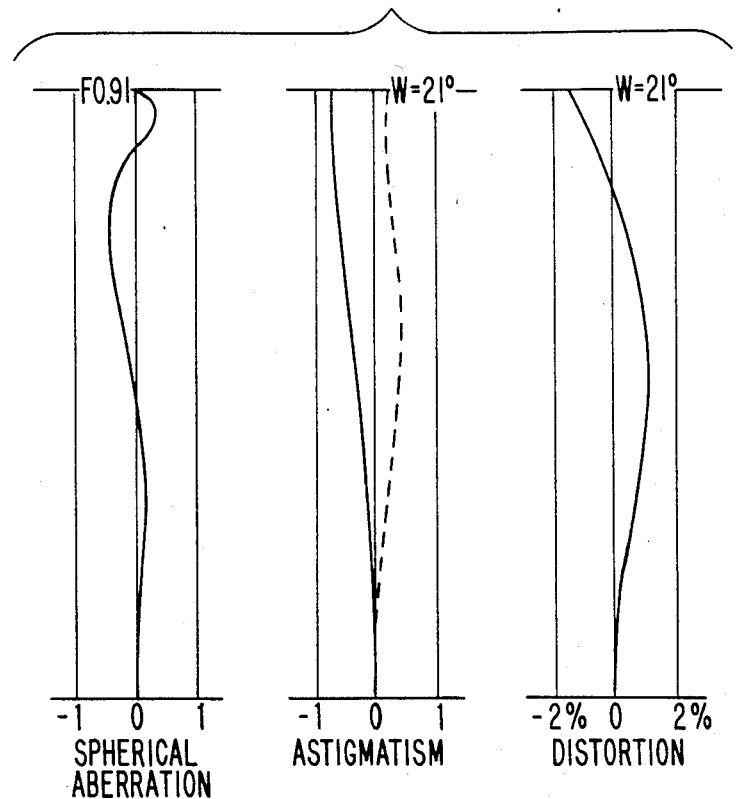
FIG. 3 shows aberrations in a first embodiment of the lens system of the invention.
Figure 4:
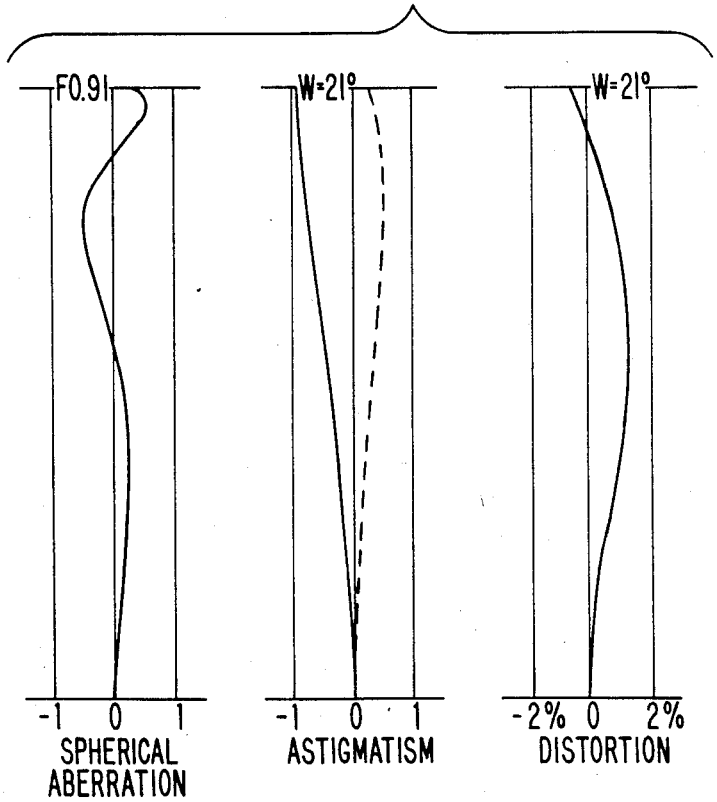
FIG. 4 shows aberrations in a second embodiment of the same.
Figure 5:
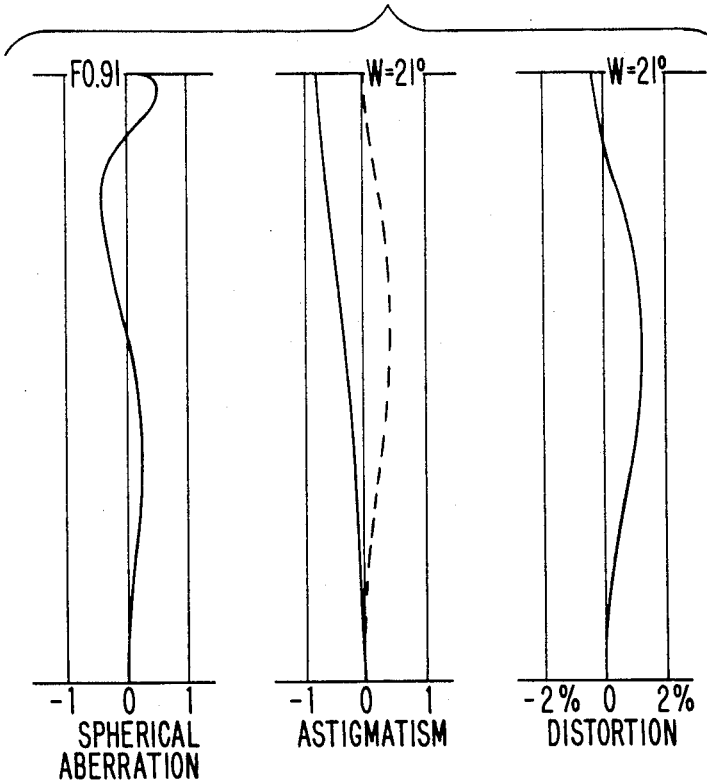
FIG. 5 shows aberrations in a third embodiment of the same.
Figure 6:
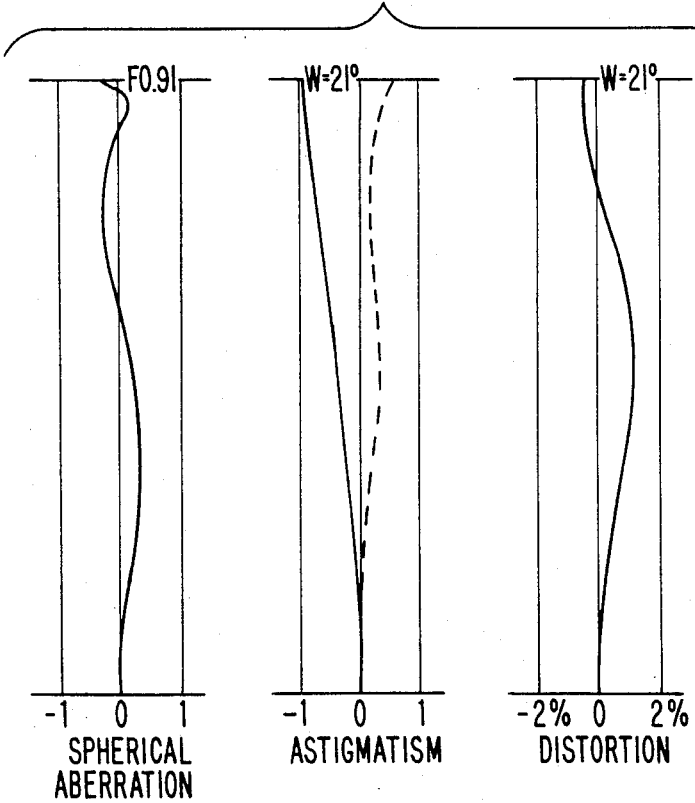
FIG. 6 shows aberrations in a fourth embodiment of the same.

The structure of an image projection lens system of the invention is shown in FIG. 2, in which first, second and third lenses L1, L2 and L3 are disposed in the recited order from the screen end (at the left side in the drawing) and spaced at necessary distances. The first lens L1 is a bi-aspherical lens the surface of which that is directed toward the screen being convex and having a larger curvature than the other surface. The second lens L2 is a double convex glass lens. The third lens L3 is a bi-aspherical lens, the surface of which that is directed toward the screen being concave and having a larger curvature than the other surface. A face plate 6 of a cathode ray tube being disposed in proximity to the third lens.

The basic construction of the invention is similar to that of the conventional lens system consisting of three elements, but differs therefrom in that, in order to obtain the necessary distance between the lens and the cathode ray tube, the distance between the second lens L2 and the third L3 is smaller than in the conventional lens system. The image projection lens system in FIG. 2 includes the first and third bi-aspherical lenses and being made of plastic respectively, and the second lens being a glass lens. Such a combination of plastic lenses with a glass lens can restrict the image plane movement due to variation in the ambient temperature. Also, the four aspherical surfaces facilitate correction of aberration.

Next, an explanation will be given based on the following conditions:

(1) $1.3f < f_1 < 1.9f$
(2) $0.9f < f_2 < 1.2f$
(3) $0.25f < d_4 < 0.35f$
(4) $r_1 < |r_2|$
(5) $0.4 < r_3/|r_4| < 0.75$ where f: the total focal length, $f_1$, $f_2$: focal lengths of the first and second lenses respectively, $d_4$: the distance between the opposing faces of the second lens and the third lens, and $r_1$, $r_2$, $r_3$ and $r_4$: the radii of vertex curvatures of the first, second, third and fourth surfaces from the screen end respectively.

Conditions (1) and (2) relate to distribution of positive power and are provided to correct the on-axis aberration and off-axis aberration in proper balance and restrict within an allowable range the image plane movement due to variation in the ambient temperature. When $f_1$ decreases so as to exceed the lower limit in the condition (1), the power of the first lens $L_1$ becomes too large and make it difficult to restrict the image plane movement due to variation in the ambient temperature. When $f_1$ becomes larger than the upper limit of condition (1), the power of the second lens $L_2$ cannot but increase so that the second bi-spherical lens $L_2$ generates too large a spherical aberration, whereby it is difficult to correct to the proper balance the on-axis aberration and off-axis aberration. When $f_2$ becomes smaller than the lower limit in condition (2), the spherical aberration generated by the second lens $L_2$ becomes too large, thereby making it difficult to correct various aberrations to the balance. When $f_2$ becomes larger than the upper limit in condition (2), the power of the first lens $L_1$ cannot but increase, thereby making it difficult to restrict the image plane movement due to variation in the ambient temperature.

Condition (3) is for increasing to a desired length the distance $d_6$ between the third lens $L_3$ and the face plate 6 of the cathode ray tube and for facilitating correction of astigmatism.

In a case where the distance $d_4$ between the second and third lenses is smaller than the lower limit, correction of astigmatisn is difficult. When $d_4$ increases so as to exceed the upper limit, the distance $d_6$ is difficult to increase to a desired length.

Condition (4) relates tothe radii of vertex curvatures; and $r_2$ of both surfaces of the first lens $L_1$. When this condition is not satisfied, it is difficult to properly correct the aberration over all the field angle.

Condition (5) relates to the radii of vertex curvatures $r_3$ and $r_4$ of both surfaces of the second lens $L_2$. When $r_3/|r_4|$ becomes smaller than the lower limit, it is difficult to properly correct the coma over all the field angle.

When $r_3/|r_4|$ becomes larger than the upper limit, it is difficult to correct aberration of the light passing through the periphery of the second lens $L_2$.

Next, concrete embodiment of the projection lens system of the invention will be described, where $r_j$ is the radius of vertex curvature at the j-th surface, $d_j$ is the distance between the j-th surface and the (j+1)-th surface, $n_i$ and $\nu_i$ and the refractive index and the Abbe number of i-th lens on the e-line respectively (i and j are positive integers). The face marked by * is an aspherical surface and when the amount of deviation from the vertex of the lens of the position of a radius Y of the aperture in the direction away from the optical axis is represented by X, X is given, by the use of aspherical coefficients $D_j$, $E_j$, $F_j$ and $G_j$, in the following equation:

$$X = r_j[1 - \sqrt{1 - (Y/r_j)^2}] + D_j Y^4 + E_j Y^6 + F_j Y^8 + G_j Y^{10}$$

In addition, the seventh and eighth surfaces are the air side surface and fluorescent material surface 7 of face plate 6 of the cathode ray tube respectively, and $n_p$ and $\nu_p$ are a refractive index and an Abbe number on the e-line respectively and $\omega$ is semi-field angle.

(Embodiment 1)

| | | f = 100, F0.91, 2ω = 42° |
|---|---|---|
| $r_1$ | = | 81.31* |
| | | $d_1 = 26.32$ $n_1 = 1.493$ $\nu_1 = 57.2$ |
| $r_2$ | = | −11224* |
| | | $d_2 = 68.67$ |
| $r_3$ | = | 93.71 |
| | | $d_3 = 21.05$ $n_2 = 1.591$ $\nu_2 = 61.0$ |
| $r_4$ | = | −177.51 |
| | | $d_4 = 31.51$ |
| $r_5$ | = | −47.60* |
| | | $d_5 = 5.26$ $n_3 = 1.493$ $\nu_3 = 57.2$ |
| $r_6$ | = | 285.62* |
| | | $d_6 = 13.13$ |
| $r_7$ | = | ∞ |
| | | $d_7 = 8.26$ $n_p = 1.507$ $\nu_p = 50.7$ |
| $r_8$ | = | 3300 |
| Aspherical coefficients | | |
| $D_1$ = $-2.56356 \times 10^{-7}$ | | $D_2$ = $5.60182 \times 10^{-8}$ |
| $E_1$ = $3.23710 \times 10^{-12}$ | | $E_2$ = $5.47599 \times 10^{-12}$ |
| $F_1$ = $-1.40243 \times 10^{-14}$ | | $F_2$ = $-1.03727 \times 10^{-14}$ |
| $G_1$ = $-1.90278 \times 10^{-19}$ | | $G_2$ = $1.66821 \times 10^{-18}$ |
| $D_5$ = $-2.31446 \times 10^{-6}$ | | $D_6$ = $-1.27916 \times 10^{-6}$ |
| $E_5$ = $2.62445 \times 10^{-9}$ | | $E_6$ = $6.26591 \times 10^{-10}$ |
| $F_5$ = $-8.12212 \times 10^{-13}$ | | $F_6$ = $-2.09727 \times 10^{-13}$ |
| $G_5$ = $2.75048 \times 10^{-16}$ | | $G_6$ = $4.68662 \times 10^{-17}$ |

(Embodiment 2)

| | | f = 100, F0.91, 2ω = 43° |
|---|---|---|
| $r_1$ | = | 81.85* |
| | | $d_1 = 26.38$ $n_1 = 1.493$ $\nu_1 = 57.2$ |
| $r_2$ | = | 5924.70* |
| | | $d_2 = 66.29$ |
| $r_3$ | = | 95.48 |
| | | $d_3 = 21.10$ $n_2 = 1.591$ $\nu_2 = 61.0$ |
| $r_4$ | = | −179.41 |
| | | $d_4 = 33.82$ |
| $r_5$ | = | −47.36* |
| | | $d_5 = 5.28$ $n_3 = 1.493$ $\nu_3 = 57.2$ |
| $r_6$ | = | 426.78* |
| | | $d_6 = 13.10$ |
| $r_7$ | = | ∞ |
| | | $d_7 = 8.24$ $n_p = 1.507$ $\nu_p = 50.7$ |
| $r_8$ | = | 3300 |
| Aspherical coefficients | | |
| $D_1$ = $-2.51429 \times 10^{-7}$ | | $D_2$ = $6.86612 \times 10^{-8}$ |
| $E_1$ = $-8.97065 \times 10^{-12}$ | | $E_2$ = $-8.13073 \times 10^{-12}$ |
| $F_1$ = $-1.42747 \times 10^{-14}$ | | $F_2$ = $-1.18013 \times 10^{-14}$ |
| $G_1$ = $-2.71508 \times 10^{-19}$ | | $G_2$ = $2.05984 \times 10^{-18}$ |
| $D_5$ = $-2.11463 \times 10^{-6}$ | | $D_6$ = $-1.15615 \times 10^{-6}$ |
| $E_5$ = $2.43354 \times 10^{-9}$ | | $E_6$ = $6.71993 \times 10^{-10}$ |
| $F_5$ = $-8.61289 \times 10^{-13}$ | | $F_6$ = $-2.18493 \times 10^{-13}$ |
| $G_5$ = $3.11704 \times 10^{-16}$ | | $G_6$ = $3.73693 \times 10^{-17}$ |

(Embodiment 3)

| | | f = 100, F0.91, 2ω = 42° | | |
|---|---|---|---|---|
| $r_1$ | = | 81.78* | | |
| | | $d_1$ = 26.44 $n_1$ = 1.493 $\nu_1$ = 57.2 | | |
| $r_2$ | = | −2018.23* | | |
| | | $d_2$ = 70.80 | | |
| $r_3$ | = | 92.07 | | |
| | | $d_3$ = 21.15 $n_2$ = 1.591 $\nu_2$ = 61.0 | | |
| $r_4$ | = | −172.79 | | |
| | | $d_4$ = 29.10 | | |
| $r_5$ | = | −48.60* | | |
| | | $d_5$ = 5.29 $n_3$ = 1.493 $\nu_3$ = 57.2 | | |
| $r_6$ | = | 236.13* | | |
| | | $d_6$ = 12.95 | | |
| $r_7$ | = | ∞ | | |
| | | $d_7$ = 8.26 $n_p$ = 1.507 $\nu_p$ = 50.7 | | |
| $r_8$ | = | 3300 | | |
| Aspherical coefficients | | | | |
| $D_1$ | = | −2.66980 × 10$^{-7}$ | $D_2$ = | 4.79662 × 10$^{-8}$ |
| $E_1$ | = | 1.50245 × 10$^{-11}$ | $E_2$ = | 1.64343 × 10$^{-11}$ |
| $F_1$ | = | −1.28204 × 10$^{-14}$ | $F_2$ = | −9.48377 × 10$^{-15}$ |
| $G_1$ | = | −6.59436 × 10$^{-20}$ | $G_2$ = | 1.65452 × 10$^{-18}$ |
| $D_5$ | = | −2.39095 × 10$^{-6}$ | $D_6$ = | −1.16709 × 10$^{-6}$ |
| $E_5$ | = | 2.70990 × 10$^{-9}$ | $E_6$ = | 6.06623 × 10$^{-10}$ |
| $F_5$ | = | −7.72658 × 10$^{-13}$ | $F_6$ = | −1.79295 × 10$^{-13}$ |
| $G_5$ | = | 2.16729 × 10$^{-16}$ | $G_6$ = | 4.14666 × 10$^{-17}$ |

(Embodiment 4)

| | | 100, F0.91, 2ω = 42° | | |
|---|---|---|---|---|
| f | = | | | |
| $r_1$ | = | 81.65* | | |
| | | $d_1$ = 25.86 $n_1$ = 1.493 $\nu_1$ = 57.2 | | |
| $r_2$ | = | −1725.11* | | |
| | | $d_2$ = 71.74 | | |
| $r_3$ | = | 91.89 | | |
| | | $d_3$ = 20.74 $n_2$ = 1.591 $\nu_2$ = 61.0 | | |
| $r_4$ | = | −173.96 | | |
| | | $d_4$ = 28.79 | | |
| $r_5$ | = | −48.98* | | |
| | | $d_5$ = 5.29 $n_3$ = 1.493 $\nu_3$ = 57.2 | | |
| $r_6$ | = | 230.42* | | |
| | | $d_6$ = 12.84 | | |
| $r_7$ | = | ∞ | | |
| | | $d_7$ = 8.26 $n_p$ = 1.507 $\nu_p$ = 50.7 | | |
| $r_8$ | = | 3300 | | |
| Aspherical coefficients | | | | |
| $D_1$ | = | −2.62514 × 10$^{-7}$ | $D_2$ = | 6.31935 × 10$^{-8}$ |
| $E_1$ | = | 1.65749 × 10$^{-11}$ | $E_2$ = | 1.66052 × 10$^{-11}$ |
| $F_1$ | = | −1.15022 × 10$^{-14}$ | $F_2$ = | −8.53085 × 10$^{-15}$ |
| $G_1$ | = | 2.08546 × 10$^{-19}$ | $G_2$ = | 1.84499 × 10$^{-18}$ |
| $D_5$ | = | −2.37721 × 10$^{-6}$ | $D_6$ = | −1.24575 × 10$^{-6}$ |
| $E_5$ | = | 2.71072 × 10$^{-9}$ | $E_6$ = | 5.99609 × 10$^{-10}$ |
| $F_5$ | = | −7.82137 × 10$^{-13}$ | $F_6$ = | −1.71520 × 10$^{-13}$ |
| $G_5$ | = | 2.23478 × 10$^{-16}$ | $G_6$ = | 4.68038 × 10$^{-17}$ |

Now, FIGS. 3, 4, 5 and 6 show the aberration in Embodiments 1, 2, 3 and 4 respectively. It can be seen from the mathematical table and aberration chart of each embodiment that the F number is 0.91 nd the lens is very bright, the lens-cathode ray tube distance is long enough so that they are not in contact with each other when in actual use, and also the aberration is sufficiently corrected. Since the second lense $L_2$ is of glass and results in a proper value of the power distribution with the first lens $L_1$, the problem of image plane movement due to variation in the ambient temperature is restricted sufficiently so that it does not cause any inconvenience.

Although several embodiments have been described, they are merely exemplary of the invention and not to be constructed as limiting, the invention being defined solely by the appended claims.

What is claimed is:

1. A projection lens system for a projection television apparatus for projecting on a screen an enlargement of an image displayed on a cathode ray tube, comprising:
   a first bi-aspherical lense of positive power, the surface of which is toward the end of the lens system which is to face the screen being a convex surface having a larger curvature than the other surface thereof;
   a second double convex lens of glass; and
   a third bi-aspherical lens of negative power, the surface of which is toward the screen end being a concave surface having a larger curvature than the other surface thereof;
   said first, second and third lens being disposed in the order from the screen end,
   said lens system satisfying the following conditions:
   (1) $1.3f < f_1 < 1.9f$
   (2) $0.9f < f_2 < 1.2f$
   (3) $0.25f < d_4 < 0.35f$
   (4) $r_1 < |r_2|$
   (5) $0.4 < r_3/|r_4| < 0.75$
   where f is the total focal length, $f_1$ and $f_2$ are the focal lengths of said first and second lenses respectively, $d_4$ is the distance between said second lens and said third lens, and $r_1$, $r_2$, $r_3$ and $r_4$ are the radii of vertex curvatures of the first, second, third and fourth lens surfaces from the screen end respectively.

* * * * *